United States Patent [19]

Sadhir et al.

[11] Patent Number: 4,845,166
[45] Date of Patent: Jul. 4, 1989

[54] COMPOSITIONS CONTAINING A MIXTURE OF A POLYHYDRIC ALCOHOL AND CHARGE TRANSFER COMPLEX OF IRRADIATED ANHYDRIDES AND CYCLIC ETHERS, USED TO CURE EPOXY RESINS

[75] Inventors: Rajender K. Sadhir, Plum Boro; Howard E. Saunders, Murrysville, both of Pa.

[73] Assignee: Westinghouse Electric Corp., Pittsburgh, Pa.

[21] Appl. No.: 21,853

[22] Filed: Mar. 4, 1987

[51] Int. Cl.$^4$ .................. C08G 59/42; C08G 59/62
[52] U.S. Cl. ........................ 528/109; 528/110; 528/297; 525/502; 522/169; 522/170; 204/157.7; 204/157.69
[58] Field of Search ............ 528/109, 110, 297; 525/502; 522/169, 170; 204/157.7, 157.69

[56] References Cited

U.S. PATENT DOCUMENTS 2,947,717  8/1960  Belanger et al. ............ 528/110
3,114,752  12/1963  Ecke ........................... 524/112
3,294,865  12/1966  Price ........................... 528/110
3,499,007  3/1970  Von Brachel et al. ........ 528/365
4,273,914  6/1981  Smith et al. ................. 528/91

OTHER PUBLICATIONS

Grant, *Hackh's Chemical Dictionary*, 1969, p. 699.
Lee & Neville, Handbook of Epoxy Resins 1967, pp. 11-1 to 11-8 and 12-1 to 12-27.
J. Polym. Sci., Polym. Chem. Ed. vol. 20, pp. 1875-1884, 1982.
Polym. Prepr. Am. Chem. Soc., Div. Polym. Chem. vol. 23, No. 1, pp. 291-292, 1982.
J. Polym. Sci. Polym. Chem. Ed. vol. 21, No. 5, pp. 1315-1329, 1983.
J. Polym. Sci. Polym. Chem. Ed. vol. 23, pp. 411-427, 1985.

Primary Examiner—John Kight
Assistant Examiner—Frederick Krass
Attorney, Agent, or Firm—Daniel P. Cillo

[57] ABSTRACT

A curing agent is made by admixing (a) an irradiated mixture of carboxylic acid anhydride and carbon containing cyclic compound and (b) a polyhhydric alcohol, where the curing agent can be added to a resin such as an epoxy resin, applied to the surface of an article, and cured.

10 Claims, 1 Drawing Sheet

COMPOSITIONS CONTAINING A MIXTURE OF A POLYHYDRIC ALCOHOL AND CHARGE TRANSFER COMPLEX OF IRRADIATED ANHYDRIDES AND CYCLIC ETHERS, USED TO CURE EPOXY RESINS

BACKGROUND OF THE INVENTION

Carboxylic acid anhydrides, Lewis Acids, and boron trifluoride:amine complexes are curing agents that have been found to be useful with epoxy resins for insulating applications, as described by Lee and Neville in the *Handbook of Epoxy Resins*, McGraw Hill, 1967, pages 11-1 to 11-8 and 12-1 to 12-27. Usually, the addition of an accelerator is required to give reasonable gel times at elevated temperatures, but at room temperature, even with high concentrations of accelerators, very slow gel times are experienced. Considerable effort has been devoted in recent years to developing improved room temperature curing agents for epoxy-anhydride resins.

Ecke et al., in U.S. Pat. No. 3,114,752, taught the reaction of tetrahydrofuran with maleic acid in the presence of a free radical initiator to produce monomeric 1:1 adducts. Free radical initiators were taught to include ultraviolet light and various persulfates, peroxides and nitrides. The compounds formed were bonded adducts rather than disassociated species such as free radicals, and were taught as useful plasticizers and curing agents for epoxy resins. Smith et al., in U.S. Pat. No. 4,273,914, discovered a low temperature, fast curing epoxy insulating composition, which consisted of an epoxy resin and a carboxylic acid anhydride complex. The anhydride complex was made by the low temperature reaction of a selected Lewis Acid catalyst, such as antimony pentachloride, titanium tetrachloride, boron trifluoride, tin tetrachloride, or triphenyl tin chloride, with a carboxylic acid anhydride. There, the catalyst and anhydride were simply pre-reacted at a reacting mass temperature of from 10° C. to about 45° C. The complex allowed substantially complete cure of the epoxy resin at 25° C. in about 48 hours.

Von Brachel et al., in U.S. Pat. No. 3,499,007, utilized a peroxide initiated, non-irradiated, free-radical chain reaction of maleic anhydride and straight chain polyalkylene ethers, at from about 80° C. to 160° C., to provide addition products, noting that the literature showed successful reaction of maleic anhydride with tetrahydrofuran, but not dioxane, in the presence of radical initiators. These addition products were found useful as raw materials for lacquers, and as surface active anhydride components in the production of polyesters. These addition products were usually reacted at from 100° C. to about 130° C. with epoxies and the like.

Charge-transfer systems have recently been shown capable of polymerizing monomer and epoxy resins. Williamson et al., *J. Polm. Sci., Polm. Chem. Ed.*, Vol. 20, pp. 1875-1884, 1982, "Laser-Initiated Polymerization of Charge-Transfer Monomer Systems" describe polymer formation after laser exposure in three successful systems: 9-vinylanthracene/diethylfumarate; 2-vinylnaphthalene/fumaronitrile, in methylene chloride solvent; and 2-vinylnaphthalene/fumaronitrile, in sulfolane solvent. Another article, "Laser Initiated Polymerization of Charge Transfer Monomer Systems: Copolymerization of Maleic Anhydride with Styrene, Vinyltoluene and t-Butylstyrene", by R. K. Sadhir et al., *Polym. Prepr. Am. Chem. Soc. Div. Polym. Chem.*, Vol. 23 No. 1, pp. 291-292, March 1982, describes vinyl-maleic anhydride systems and a theoretical discussion of 3,600 Angstrom Unit laser irradiation of such systems to form charge transfer systems.

Later articles, "Laser-initiated Copolymerization of Maleic Anhydride with Styrene, Vinyltoluene, and t-Butylstyrene", by R. K. Sadhir et al., *J. Polym. Sci. Polym. Chem. Ed.*, Vol. 21, No. 5, pp. 1315-1329, May 1983, and "Laser-Initiated Polymerization of Epoxies in the Presence of Maleic Anhydride", by R. K. Sadhir et al., *J. Polym. Sci. Polym. Chem. Ed.*, Vol. 23, pp. 411-427, 1985, give a more detailed description of laser-initiated polymerization of styrene, vinyltoluene and t-butystyrene in the presence of maleic anhydride, and laser-initiated polymerization of cyclohexene oxide in the presence of maleic anhydride, respectively.

Sadhir et al., in U.S. Patent Application Ser. No. 731,745, filed on May 7, 1985, utilized a reactive, irradiated catalytic complex as a low temperature curing agent for organic resins. The complex was produced by U.V. or laser irradiating a mixture of carboxylic acid anhydride and at least one of a cyclic compound selected from tetrahydrofuran, dioxane, trioxane and sulfolane, with no use of catalysts or initiators. Another application in the area is Sadhir et al., U.S. Patent Application Ser. No. 703,165, filed on Feb. 19, 1985, which used additional catalysts.

Sadhir et al., in U.S. Patent Application Ser. No. 739,242 filed on May 30, 1985, cold concentrated these irradiated catalytic complexes to improve reactivity. These concentrated catalytic complexes were described as sole room temperature catalysts with epoxy resins and vinyl monomers, to provide impregnating, potting, or protective encapsulating resins for motor coils, or coil connection insulators for high voltage rotating apparatus. Examples showed a quick room temperature cure with cycloaliphatic epoxy resins. It had been found, however, that these complexes provided a slower room temperature cure with bisphenol A epoxy resins than with cycloaliphatic epoxy resins.

Since the bisphenol A epoxy is the most commonly used and inexpensive type of epoxy resin, it is highly desirable to find a fast acting catalyst for them which is useful at room temperature, and to provide fast, room temperature curable bisphenol A epoxy coating compositions. It would also be highly desirable to be able to fast cure cycloaliphatic epoxy resins at times below 3 minutes at room temperature, for fast production line, thin coating of a variety of articles.

As a further improvement, Saunders et al., in U.S. Patent Application Ser. No. 926,304, filed on Nov. 3, 1986, utilized a boron trihalide complex in the concentrated catalytic complexes of Sadhir et al., to lower room temperature cure time. Inclusion of such complexes tended however to lower electrical properties of the cured composition somewhat. Additionally, in the cases involving concentrated catalytic complexes, crystallization in the solution can occur in the range of about 10% to 15% concentration after 6 hours to 10 hours, limiting storage life and mixing ability. What is needed is a means to concentrate the catalytic complexes without crystallization and to modify their structure to provide an extremely reactive curing agent for resin systems.

SUMMARY OF THE INVENTION

The above problems have been solved and the above needs met by providing a curing agent particularly effective for epoxy resins, containing the admixture of: (1) a charge transfer complex (CTC) produced by mixing and irradiating a combination of: (a) a carboxylic acid anhydride, selected from halide or short chain alkyl substituted carboxylic anhydride, and preferably citraconic anhydride or maleic anhydride, and their mixtures, and (b) a carbon containing cyclic compound containing an electron deficient element, such as sulfur or preferably oxygen and their mixtures, selected from the group consisting of tetrahydrofuran, dioxane, trioxane, and sulfolane, and their mixtures, and (2) a polyhydric alcohol, i.e., one containing two, three or four hydroxyl groups, such as 1,4 butane diol, trimethylol propane, or pentaerythritol. Preferably, the irradiated mixture of carboxylic acid anhydride and carbon containing cyclic compound is concentrated before mixing with the polyhydric alcohol.

The preferred weight ratio of carboxylic acid anhydride:carbon containing cyclic compound in the catalytic complex is from about 1:0.8 to 2. In the reaction to form the unconcentrated charge transfer complex, no free radical initiators are used, and the temperature is preferably kept below about 45° C. The weight ratio of charge transfer complex:polyhydric alcohol can generally be from about 2 to 50:1.

The charge transfer complex can be concentrated without the use of heat, in, for example, a vacuum chamber or other vacuum means, to from about 55% to about 90% of its original weight, to remove plasticizing compounds. The highly reactive mixture of concentrated charge transfer complex and polyhydric alcohol, is the curing agent of this invention. When, for example, it is added in a weight ratio of epoxy resin:curing agent of from about 1:0.2 to 0.8, it will effect substantially complete cure at 25° C. of thick coatings of epoxy resins in a short time. No additional curing agents are needed.

In a preferred embodiment of this invention, the polyhydric alcohol is added to a concentrated charge transfer complex at temperatures ranging from about 20° C. to 85° C. The polyhydric alcohol has been found to react with radical anion or cation anhydride groups in the charge transfer complex and with unreacted carboxylic acid anhydride, resulting in a slightly higher molecular weight material less prone to crystallization. The polyhydric alcohol reacts with anhydride to produce ester groups, and also carboxyl groups which are more reactive toward epoxy than corresponding anhydrides. The reaction can slowly continue to form long chain oligomers at 25° C. to 40° C.

The irradiation to form the unconcentrated charge transfer complex can be, for example, from a laser or a U.V. lamp, and contains radiation within the wavelength range of from about 100 Angstrom units to about 7,000 Angstrom units. The irradiation is effective only when both the selected carboxylic acid anhydride and the selected carbon containing cyclic compound are mixed together, the irradiation of the mixed product solution producing an active species which is responsible for helping to initiate resin polymerization at room temperature. The resins incorporating these curing agents can be used to encapsulate electrical articles, to act as an insulating adhesive, and to act as room temperature curable surface coating paints of 0.02 inch thickness or less, for steel, other metals, wood, and plastics.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
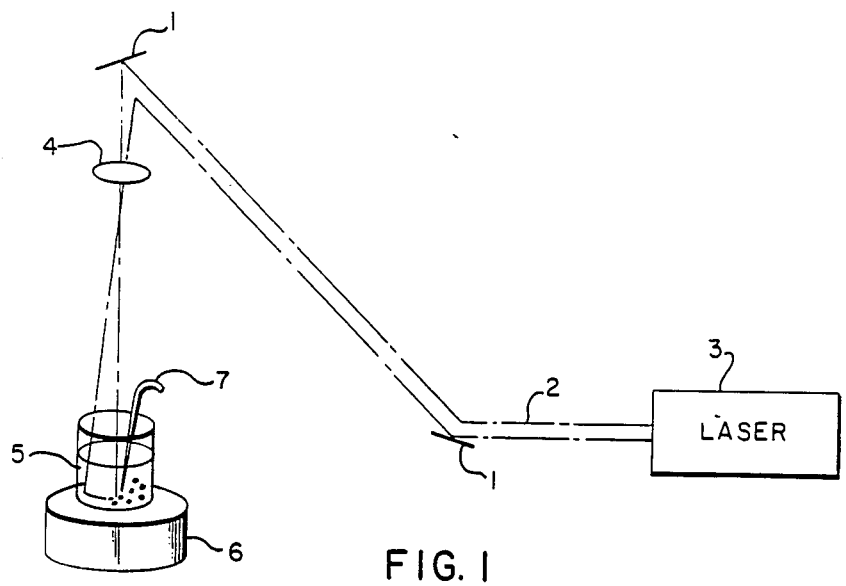
FIG. 1 shows one type of apparatus that can be used to produce the cyclic catalytic complexes used in this invention.

It has been found that selected carbon containing cyclic compounds, containing an electron deficient element, can effectively interact and complex with selected carboxylic acid anhydrides, through irradiation containing radiation within the radiation wavelength range of from about 100 Angstrom units to about 7,000 Angstrom units, preferably in the range, of from about 2,000 Angstrom units to about 7,000 Angstrom units, and most preferably from about 2,000 Angstrom units to about 3,900 Angstrom units. The irradiation need not be wide band, but can be any portion within the band. Laser irradiation, for example with an Argon laser at about 3,600 Angstrom units, is a very concentrated and energy efficient substitute for common ultraviolet (U.V.) lamp sources, and allows the reaction to proceed at about 25° C. without the need for cooling.

When a laser is used, 5 minutes to 60 minutes irradiation will provide an effective amount of reactive species, which when mixed with a polyhydric alcohol can be used to cure epoxy resins. When a 250 watt to 500 watt U.V. lamp is used, 15 minutes to 90 minutes will provide an effective amount of reactive species, which when mixed with a polyhydric alcohol can be used to quick cure epoxy resins. Preferably, especially if bisphenol A epoxies are to be used, the charge transfer complex will be further concentrated. In the case of the U.V. lamp, the reacting mixture is preferably surrounded by a refrigeration means, so that the heat of the U.V. lamp does not cause undue evaporation of the reactants before the reaction is completed. In all cases, the temperature should be kept below about 45° C., to prevent evaporation of reactants, for example, maleic anhydride has a sublimation temperature of about 52° C. and tetrahydrofuran has a boiling point of about 66° C.

The useful carbon containing cyclic compounds for the cyclic charge transfer complex (CTC) component of the curing agent of this invention contain one or more sulfur and/or oxygen, preferably oxygen, electron deficient elements or components, where the electron deficient element or component need not be present in the ring structure. Particularly useful compounds of this type include sulfolane, trioxane, and preferably dioxane (1,4-dioxane) and tetrahydrofuran, whose respective chemical structures are shown below:

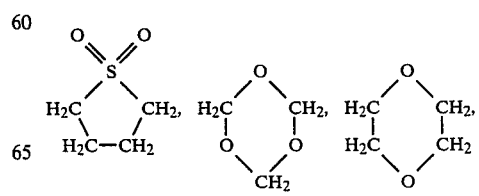

-continued

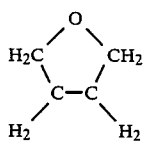

Useful carboxylic acid anhydrides for these complexes include a class of carboxylic acid anhydrides having the chemical formula:

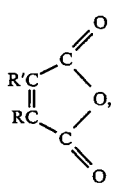

where R and R′ = H, $CH_3$, $C_2H_5$, Cl, Br or I, for example, R′ can = Cl and R can = $CH_3$.

Use of a higher alkyl than $C_2H_5$ as R or R′ will slow the irradiation reaction with the carbon containing cyclic compound. The most preferred carboxylic acid anhydrides are those where R=H and R′=$CH_3$, and where R and R′=H, i.e., citraconic anhydride, and preferably maleic anhydride, respectively:

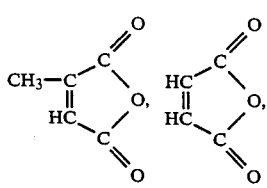

Other carboxylic acid anhydrides, such as hexahydrophthalic anhydride, succinic anhydride, and dodecenyl succinic anhydride, are not effective to provide catalytic reactive species. The double bond opposite the central, single bonded oxygen, appears to be of critical importance in providing catalytic reactive species with the above-described carbon containing cyclic compounds during irradiation. The carbon containing cyclic compounds act as a solvent for the selected acid anhydrides which are usually in solid form. The preferred weight range of (selected carboxylic acid anhydride):(selected carbon containing cyclic compound) is from about (1):(0.8 to 2). Less than 0.8 part/1 part acid anhydride, a solution will not result. Over 2 parts/1 part acid anhydride, the complex may not form.

Usually, the selected acid anhydride is added to the selected liquid carbon containing cyclic compound, acting as solvent, and mixed, at about 25° C. to 30° C., until a solution results. At this point there is no interaction between the two ingredients other than solution formation, i.e., the product of the mixture contains no complexes or reactive species. Then a source of irradiation, such as a bank of U.V. lamps or, for example, an Argon ion laser beam, which provides concentrated radiation and fast interaction, is directed into the solution. FIG. 1 of the Drawings, shows the use of a coherent CR-18 Argon ion laser to produce useful complexes for curing resins. In FIG. 1, mirrors 1 reflect laser beam 2, from laser source 3, through convex lens 4 into monomer solution 5, in contact with magnetic stirrer means 6, and having optional nitrogen bubbler means 7.

Upon irradiation of the solution, preferably with radiation containing the wavelength range of from about 2,000 Angstrom units to about 5,200 Angstrom units, and most preferably within the range of from about 2,000 Angstrom units to about 3,900 Angstrom units, a charge transfer complex forms. Although applicants are not to be held to any particular theory, using the interaction between maleic anhydride and dioxane as an example, the possible reactions that, it is thought, might occur include:

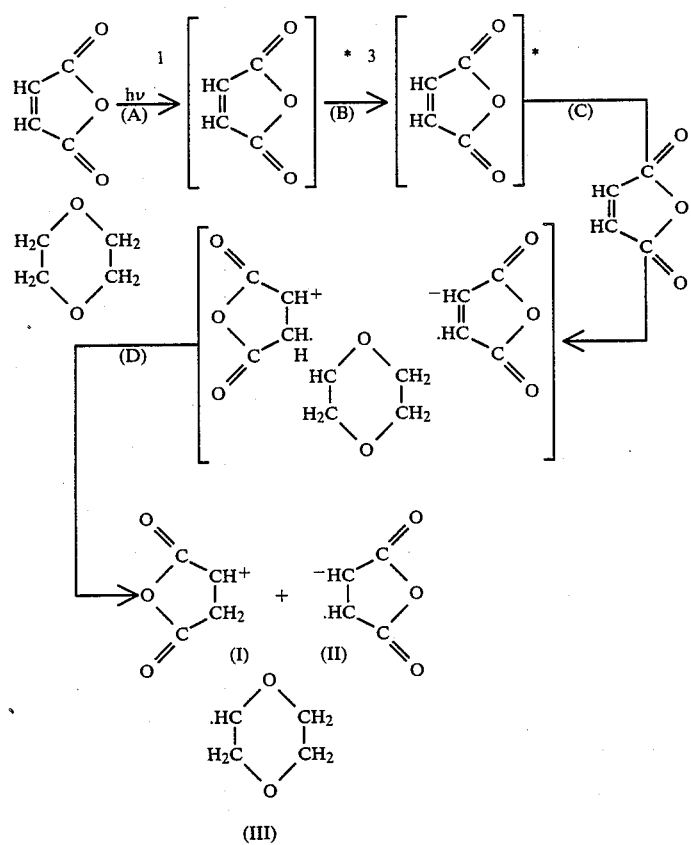

As shown in the previously described reactions, it is believed that argon ion laser action on the product solution and mixture of maleic anhydride and dioxane in step (A) produces a singlet excited species which goes to triplet excited state via step (B). The triplet excimer thus produced reacts with another maleic anhydride unit in the ground state (step C) and produces a reactive charge transfer complex (after step C). This charge transfer complex then abstracts a hydrogen atom from dioxane. This results in a color change between step (C) and step (D) indicating the presence of catalytic complexes, consisting essentially of reactive species such as cation (I), radical anion (II) and a free radical (III) containing only an electron as a reactive component. The catalytic complexes are capable of initiating cationic polymerization in epoxies.

In addition to the reactive species shown, it has been found that a substantial amount, i.e., from about 20% to about 50% of carbon containing cyclic compound added, i.e., such as dioxane, remains unreacted. Additionally, it has been found that a substantial amount of carboxylic acid anhydride also remains unreacted. No deliberate heating is used, care being taken to react only up to about 45° C., with no catalysts, or initiators being present, the reaction proceeding solely due to irradiation effects.

The unreacted, carbon containing cyclic compound remaining after charge transfer complex production, be it dioxane, sulfolane or tetrahydrofuran, has been found to provide a plasticizing effect on epoxy resins, slowing resin cure at 25° C. Continued irradiation has not been found to reduce substantially the plasticizing effect of the unconcentrated charge transfer complex. Heating the charge transfer complex in an attempt to reduce the amount of unreacted, carbon containing cyclic compound may cause decomposition of the already formed complex. A means to cold concentrate the charge transfer complex, such as passing a stream of nitrogen gas over the catalytic complex at 25° C., or preferably using a vacuum chamber at 25° C., has been found useful to remove substantially all of the unreacted, carbon containing cyclic compound and reduce substantially the plasticizing effect of the complex. It is also speculated that the concentration may open up some rings of the carbon containing cyclic compounds, providing additional reactive species.

Unreacted carboxylic acid anhydride remains even after cold concentration. Addition of polyhydric alcohol causes a reaction not only with the anhydride groups in the charge transfer complex but also with anhydride which has not reacted, producing carboxyl end groups which are more reactive toward epoxy resins than corresponding anhydrides, thus helping to increase the reactivity of the curing agent. Also, this reaction forms a more viscous material having a slightly higher molecular weight which inhibits crystallization. It is thought that one hydrogen from the polyhydric alcohol attaches to the oxygen of the opened anhydride ring, while the remaining —O—$C_n$—$H_{2n}$—OH group attaches to the carbon, forming an ester linkage, shown as the addition product:

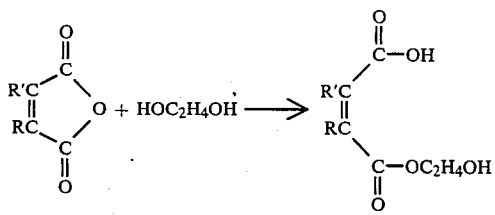

Where the anhydride type reactant is the charged radical anion or cation form (II) and (I) of the charge transfer complex, described previously, it is believed that the charge remains on the addition product. At low concentrations of polyol, i.e., about 8 to 50:1 of CTC:polyol, a substantial amount of unreacted anhydride and charge transfer complex radical anion or cation anhydride remain. This material will have a long pot life yet control crystallization. The curing agent itself will initially contain: (a) charge transfer complex, (b) polyol reaction products of radical anion or cation portions of the charge transfer complex, (c) polyol reaction products of previously unreacted anhydride, (d) unreacted polyol, (e) unreacted anhydride, and possibly (f) some unremoved carbon containing cyclic compound such as dioxane. As time passes more and more polyol will slowly react with both the unreacted anhydride and the radical anion and cation forms of the charge transfer complex.

The term "polyhydric alcohol", i.e. polyol, as used herein, is defined as an alcohol having a carbon chain containing from $C_2$ to $C_{15}$ atoms preferably $C_2$ to $C_6$ atoms and containing two, three or four hydroxyl (—OH) groups. Use of over $C_{15}$ atoms in the carbon chain of the polyol would make the cured resin too flexible and detract from its physical strength properties. The preferred polyhydric alcohols contain three hydroxyl groups, such as trimethylol propane (hexaglycerol) $C_2H_5C(CH_2OH)_3$, glycerol $C_3H_5(OH)_3$, and the like. Polyhydric alcohols containing four hydroxyl groups are useful, such as pentaerythritol $C(CH_2OH)_4$, and the like. Polyhydric alcohols containing two hydroxyl groups are also useful, such as 1,6 hexane diol $CH_2OH(CH_2)_4CH_2OH$; 2,3 hexane diol $CH_3(CH_2)_2(CHOH)_2CH_3$; 1,2 propane diol (propylene glycol); 1,3 propane diol (trimethylene glycol); 1,2 pentane diol; 1,4 pentane diol; 1,5 pentane diol; 2,3 pentane diol; 1,2 butane diol; 1,3 butane diol; 1,4 butane diol; 2,3 butane diol; ethylene glycol $CH_2OHCH_2OH$; and the like, particularly ethylene glycol and propane diol. Mixtures of polyhydric alcohols are also useful in the invention.

The weight ratio of charge transfer complex: polyhydric alcohol can generally be from about 2 to 50:1, i.e., one part polyhydric alcohol to from 2 parts to 50 parts charge transfer complex. Concentrations of polyhydric alcohol greater than one part alcohol to 2 parts charge transfer complex may cause too much flexibility in the cured resin and result in an undesirable excess of polyol. Concentrations of polyhydric alcohol less than one part alcohol to 50 parts charge transfer complex may not help much in increasing reactivity and reducing crystallization.

Concentration of the charge transfer complex mixture can be from about 55% to 90%, preferably from about 65% to 85% of its original weight. Concentration below about 60% is very difficult, and not concentrating below about 90% does not yield much benefit in terms of gel and cure times to justify the expense of utilizing a cold concentrating means. Concentrating between 65% and about 80% yields a very workable thick slurry material. Concentration between about 55% and 65% yields a still useful material of increasing solidity as 55% is approached. The term "cold concentration" as used herein is defined as concentration in the temperature range of from about 18° C. to about 30° C. The term "X% concentrated" as used herein is defined as concentrated to X% of its original weight, i.e., 85% concentrated means that 15% of the original weight has been evaporated.

Bisphenol based epoxy resins are useful in this invention, especially with the preferred, highly concentrated curing agents previously described. These resins may be used as the base resin in the invention, or used in combination with, for example, a cycloaliphatic epoxy. A bisphenol type resin is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction and the product is then washed free of salt and base. The product, instead of being a single simple compound, is generally a complex mixture of glycidyl polyethers, but the principal product may be represented by the chemical structural formula:

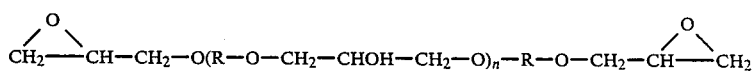

where n is an integer of the series, 0, 1, 2, 3 ..., and R represents the divalent hydrocarbon radical of the dihydric phenol. Typically R is:

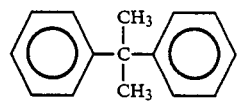

to provide a diglycidyl ether of bisphenol A type epoxy resin or

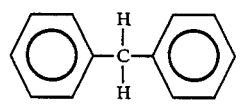

to provide a diglycidyl ether of bisphenol F type epoxy resin.

The bisphenol epoxy resins used in the invention have a 1, 2 epoxy equivalency greater than one. They will generally be diepoxides. By the epoxy equivalency, reference is made to the average number of 1, 2 epoxy groups,

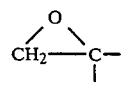

contained in the average molecule of the dlycidylether.

Other epoxy resins that are particularly useful alone or in admixture with bisphenol epoxy resins are epoxy novolacs. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

Other epoxy resins useful alone or in mixture with bisphenol types include glycidyl esters, hydantoin epoxy resins, cycloaliphatic epoxy resins and diglycidyl ethers of aliphatic diols. Of these latter four varieties of epoxies, cycloaliphatic epoxies are most useful. The cycloaliphatic type epoxy resins that can be employed as the resin ingredient in the invention are selected from nonglycidyl ether epoxy resins containing more than one 1,2 epoxy group per molecule. These are generally prepared by epoxidizing unsaturated hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides ketones to give the compound R—COOOH.

Examples of cycloaliphatic epoxy resins would include: 3,4-epoxycyclohexylmethyl-3, 4-epoxycyclohexane carboxylate (containing two epoxide groups which are part of ring structures, and an ester linkage); vinyl cyclohexene dioxide (containing two epoxide groups, one of which is part of a ring structure); and 3,4-epoxy-6-methylcyclohexyl methyl-3,4-epoxy-6-methylcyclohexane carboxylate. All of these types of epoxy resins described previously are well known in the art, and reference can be made to U.S. Pat. No. 4,273,914 for additional details in their production. Cycloaliphatic epoxy resins used alone do not require cold concentrating of the dual curing agent admixture of this invention.

Other useful organic resins that can be used in this invention, generally in minor amounts with the epoxies and the curing agents previously described, include vinyl monomers, such as, styrene, 4-methoxy styrene, vinyl toluene, methyl methacrylate, methyl vinyl ketone, or 1,1 diphenyl ethylene and the like, and their mixtures. These resins are well known in the art.

The preferred weight ratio range of epoxy resin: curing agent is from about 1:0.2 to 0.8, preferably from about 1:0.3 to 0.6. Use of less than about 0.2 part curing agent/1 part epoxy resin will provide little gel or cure time improvement. Use of over 0.8 part curing agent/1 part epoxy resin will result in minimal pot life or working time. The range between about 1:0.60 to 0.8 can be especially useful when a filler is used, since filler inclusion often seems to substantially delay gel time.

Natural oil extenders, such as epoxidized linseed or soy bean oils, may also be used in small amounts as epoxy resin additives. Polyhydric alcohols, having carbon chains from $C_2$ to $C_{15}$, can also be added directly to the epoxy resin, acting as a cross-linking agent when the carbon chain is from $C_2$ to $C_5$, or as a flexibilizer when the carbon chain is from $C_6$ to $C_{15}$, helping to tailor heat distortion temperature and flexibility. They can be added in amounts up to 1:1 epoxy:polyol for certain paint applications. Thixotropic agents, such as fumed alumina or fumed silica, having particle sizes of from about 0.005 micron to 0.025 micron, and coloring pigments, such as titanium dioxide, zinc chromate, zinc oxide, zinc sulfide, zirconium oxide, iron oxide, and the like may be used in minor amounts as aids in enhancing the color tones of the cured resins and making paint like compositions.

Similarly, various inorganic particulate fillers, such as alumina trihydrate, silica, quartz, mica, chopped glass fibers, beryllium aluminum silicate, magnesium silicate, lithium aluminum silicate, mixtures thereof, and the like, in average particle sizes from about 5 microns to about 150 microns, may be employed in amounts up to about 50 parts per 100 parts of resin, to improve electrical properties of the resin formulation, and to lower costs. Photoinitiators are neither required nor desired, since they can provide an impurity element in the composition.

Figure 2:
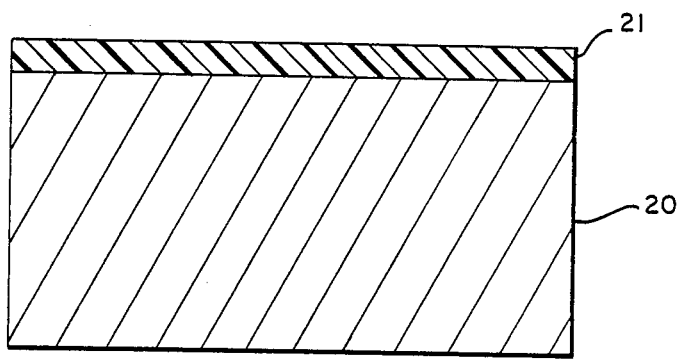
FIG. 2 shows a thin surface coating of the resinous composition of this invention on a metal substrate.

Referring now to FIG. 2 of the Drawings, a metal substrate 20 is coated with a thin coating 21 of the resinous composition of this invention. Substrates can include aluminum, copper and other metals, wood, plastic, and the like. These compositions can be coated in thickness of 0.02 inch or less. Thin films, from about 0.0005 inch to 0.005 inch thick, can be cured in air at from about 25° C. to about 30° C., to provide coatings which are quite flexible and have excellent adhesion and electrical insulating properties.

EXAMPLE 1

A batch of charge transfer complex (CTC) solution was first made, containing 50 grams (0.51 mole) of maleic anhydride (MAH) dissolved in 50 milliliters (44.5 grams) of tetrahydrofuran (THF). The MAH and THF were well mixed in a stainless steel beaker with a magnetic stirrer. The beaker was wrapped with copper tubing and the beaker was kept in a bath of ethylene glycol-water mixture. Refrigerated ethylene glycol-water coolant, kept at -20° C. using an Endocol, Neslab refrigeration unit, was circulated through the copper coil wrapped around the beaker and also dipped in the ethylene glycol-water bath. The bath temperature was about 2° C. During stirring, the mixture was subjected to U.V. irradiation from a 300 watt U.V.-D bulb having a wavelength band between 2,000 Angstrom units and 4,000 Angstrom units, with primary wavelengths between about 3,600 Angstrom units and 3,900 Angstrom units. The cooling arrangement was necessary to dissipate the heat energy generated by the D bulb, so that the mixture components would not evaporate before reaction. In all cases the temperature must be maintained below about 40° C.

After 30 seconds of irradiation, the mixture temperature increased from 18° C. to 35° C., after which the D bulb was shut off and the mixture was allowed to cool down to 18° C. over a 2 minute to 3 minute period. Then the solution was irradiated until a 35° C. temperature was reached, after which it was again cooled to 18° C. This irradiation and cooling cycle was repeated until a total U.V. exposure time of 15 minutes was obtained. During the 15 minutes irradiation, the colorless MAH-THF solution was turned to red, indicating some interaction between the MAH and the THF. The development of color was followed spectrophotometrically. In the MAH-THF mixture, charge transfer complexes, having an absorption maxima at about 4,480 Angstrom units were formed. The irradiated, highly fluid solution of MAH-THF, the charge transfer complex, was found to contain a substantial amount of unreacted material from about 20% to about 50% of the THF added as well as from about 10% to 15% of the maleic anhydride added, as determined by gel permeation chromatography.

This unconcentrated charge transfer complex was then placed in a small vacuum chamber apparatus, i.e., a vacuum dessicator attached to a vacuum line drawing mixtures of epoxy resin-control curing agent and curing agent containing concentrated charge transfer complex and polyhydric alcohol were then coated on 3"×6"×0.1" steel strips and left to cure at 25° C. for 24 hours, to provide 1 mil (0.001") thick coatings. Electrical properties, impact strength, and flexibility properties were determined and are shown below in Table 1:

TABLE 1

| Sample | Resin | Dual Curing Agent Wt. Ratio ConCTC: Polyhydric Alcohol | Wt. Ratio Resin: Dual Curing Agent | Impart Strength | Flexibility: Mandrel Conical Bend Test | Dissipation 100 Tan δ | | |
|---|---|---|---|---|---|---|---|---|
| | | | | | | 25° C. | 100° C. | 125° C. |
| 1. | ERL-4221 | 9:1 ethylene glycol ($C_2$ carbon chain) | 10:4 | 20 in-lb | >1½ in. | 0.2 | 6.5 | 8.9 |
| 2. | ERL-4221 | 9:1 propylene glycol ($C_3$ carbon chain) | 10:4 | — | — | 0.2 | 16.5 | — |
| 3. | ERL-4221 | 9:1 1,4 butane diol ($C_4$ carbon chain) | 10:4 | 50 in-lb. | ⅝ in. | 2.8 | 54.5 | — |
| 4. | ERL-4221 | 9:1 pentane diol ($C_5$ carbon chain) | 10:4 | — | — | 4.6 | 26.5 | — |
| 5. | ERL-4221 | 9:1 hexane diol ($C_6$ carbon chain) | 10:4 | 100 in-lb. | ¼ in. | 3.1 | 60+ | — |
| 6. | ERL-4221 | 9:1 trimethylol propane ($C_4$ carbon chain) | 10:4 | 20 in-lb. | 1½ in. | 0.2 | 5.2 | 7.7 |
| 7. | ERL-4221 | 8:2 trimethylol propane ($C_4$ carbon chain) | 10:4 | 10 in-lb. | >1½ in. | 0.2 | 5.3 | 5.0 |
| 8. | ERL-4221 | 20:10 trimethylol propane ($C_4$ carbon chain) | 10:4 | — | — | 0.2 | 5.5 | 4.8 |
| 9. | ERL-4221 + EPON-828 | 9:1 ethylene glycol ($C_4$ carbon chain) | 10:4 | 40 in-lb. | ¾ in. | — | — | — |
| 10.* | ERL-4221 | 1:0 | 10:4 | <10 in-lb. | >1½ in. | 0.2 | 3.8 | 17.0 |

*Control Sample - no added polyol
ERL-4221 is a cycloaliphatic epoxy resin and EPON-828 is a bisphenol A epoxy resin.

0.5 Torr to 1.0 Torr., until its weight was reduced to 85% of its original weight, i.e., 15% concentrated. This concentration was carried out at 25° C., and produced a concentrated, solution having substantially all of the unreacted THF removed without decomposing the already formed charge transfer complex. The concentrated charge transfer complex was still in liquid form and still contained unreacted maleic anhydride.

Various amounts of different polyhydric alcohols were then quickly admixed with samples of the concentrated charge transfer complex solution, containing unreacted maleic anhydride, at about 25° C., except that trimethylol propane inclusion required 5 minutes of stirring at 35° C. In all cases, after admixing to form the dual curing agent, an increase in viscosity occurred, indicating addition reactions of polyol and anhydride types. These samples, including one control sample containing no polyhydric alcohol, were later added to 3,4-epoxycyclohexylmethyl-3,4-epoxycyclohexane carboxylate, a cycloaliphatic epoxy resin having a viscosity at 25° C. of 350 cps. to 400 cps. and an Epoxy Equivalent Weight of 133 (sold commercially by Union Carbide under the Tradename ERL-4221). A dual curing agent containing concentrated charge transfer complex and ethylene glycol was also added to a mixture of 75 parts ERL-4221 and 25 parts of a liquid diglycidyl ether of bisphenol A resin, having a viscosity at 25° C. of 10,000 cps. to 16,000 cps. and an Epoxy Equivalent Weight of 185-192 (sold commercially by Shell Chemical under the Tradenan Epon-828).

In all cases the curing agents and control sample were allowed to sit about 1 week before addition to the epoxy resins. During this time only the polyhydric alcohol free control sample showed visible evidence of a crystallization problem. The control sample was also difficult to mix into the epoxy resin, and did not provide a homogeneous admixture with the epoxy resin. These As can be seen from Table 1, trimethylol propane and ethylene glycol exhibited better overall electrical properties than the control, evident at 125° C. The other samples would be useful for non-electrical encapsulation. The best overall candidates were trimethylol propane, ethylene glycol and propylene glycol. Samples 1, 3, 5, 6 and 9 were highly flexible showing outstanding high impact strength and ability to bend around small diameter mandrels. Very importantly, the dual curing agent component had good storage and mixing properties, and samples 1 through 9 all had gel times equal to or better than the control sample. Using the dual curing agents of this invention, epoxy resin compositions can be made using the dual curing agents of this invention with a 25% concentrated charge transfer complex component, where the dual curing agent would exhibit excellent stability and mixability.

Additionally, these curing agents can be used with epoxy resin based paint formulations. The paint formulation would generally contain resin such as epoxy resin, pigment, filler, and thixotropic agent highly ball milled together. Preferably, the paint formulation and the curing agent would be put into separate feed containers in a two component air pressure spray gun, which would mix the two components in a mixing chamber just before the spray head. This type apparatus could be used advantageously for fast, room temperature, production line coating.

We claim:
1. A resinous composition comprising:
(A) an epoxy resin; and
(B) a curing agent consisting essentially of:
   (i) a reactive charge transfer complex which has been prepared in the absence of free radical initiators comprising the irradiated mixture of a car- boxylic acid anhydride having the chemical formula:

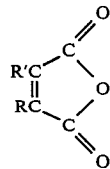

where R and R′ = H, CH$_3$, C$_2$H$_5$, Cl, Br or I, and a carbon containing cyclic compound containing an electron deficient element selected from the group consisting of sulfur, oxygen, and mixtures thereof, and (ii) a polyhydric alcohol having a carbon chain containing from C$_2$ to C$_6$ carbon atoms, where the weight ratio of reactive charge transfer complex:polyhydric alcohol is from about 2 to 50:1.

2. The composition of claim 1, where the carboxylic acid anhydride is selected from the group consisting of citraconic anhydride and maleic anhydride, and the carbon containing cyclic compound is selected from the group consisting of dioxane, tetrahydrofuran and mixtures thereof.

3. The composition of claim 1, where the weight ratio of epoxy resin: curing agent is from about 1:0.2 to 0.8, the reactive complex consists essentially of the irradiated mixture of carboxylic acid anhydride and carbon containing cyclic compound, the weight ratio of carboxylic acid anhydride:carbon containing cyclic compound is from 1:0.8 to 2, and the polyhydric alcohol contains from 2 to 4 hydroxyl groups.

4. The composition of claim 1, where the irradiated mixture of carboxylic acid anhydride and carbon containing cyclic compound is concentrated before mixing with the polyhydric alcohol, prior to admixing with the epoxy resin, and the polyhydric alcohol is selected from the group consisting of trimethylol propane, propane diol, ethylene glycol, and mixtures thereof.

5. The composition of claim 1, where polyhydric alcohol is also included in the epoxy resin component.

6. The composition of claim 1, also containing coloring pigment.

7. The composition of claim 1, where the curing agent is a reaction product of (i) and (ii) and contains charge transfer complex and polyhydric alcohol reacted with portions of the charge transfer complex.

8. The composition of claim 1, where the carboxylic acid anhydride is selected from the group consisting of citraconic anhydride and maleic anhydride, the carbon containing cyclic compound is selected from the group consisting of dioxane, tetrahydrofuran and mixtures thereof and the polyhydric alcohol is selected from the group consisting of trimethylol propane, propane diol, propylene glycol, ethylene glycol, and mixtures thereof.

9. The composition of claim 1, where the carboxylic acid anhydride is maleic anhydride, the carbon containing cyclic compound is tetrahydrofuran, and the polyhydric alcohol is trimethylol propane.

10. The composition of claim 1, where the epoxy resin comprises a cycloaliphatic epoxy resin.

* * * * *